United States Patent
Esmaeilzadeh

(10) Patent No.: US 7,498,284 B2
(45) Date of Patent: Mar. 3, 2009

(54) GLASS MATERIAL AND METHOD OF PREPARING SAID GLASS

(75) Inventor: Saeid Esmaeilzadeh, Stockholm (SE)

(73) Assignee: Diamorph AB, Stockholm (SE)

( * ) Notice: Subject to any disclaimer, the term of this patent is extended or adjusted under 35 U.S.C. 154(b) by 0 days.

(21) Appl. No.: 10/541,871

(22) PCT Filed: Jan. 14, 2004

(86) PCT No.: PCT/SE2004/000034

§ 371 (c)(1),
(2), (4) Date: Jul. 11, 2005

(87) PCT Pub. No.: WO2004/063107

PCT Pub. Date: Jul. 29, 2004

(65) Prior Publication Data

US 2006/0128551 A1 Jun. 15, 2006

(30) Foreign Application Priority Data

Jan. 14, 2003 (SE) .................................. 0300056

(51) Int. Cl.
C03C 3/11 (2006.01)
C04B 35/597 (2006.01)
H01F 1/01 (2006.01)

(52) U.S. Cl. .................. 501/56; 501/97.1; 501/97.2; 501/97.3; 501/98.1; 501/98.2; 501/40; 501/96.5; 501/64; 501/73; 252/62.51 R

(58) Field of Classification Search .............. 501/40, 501/97.1, 97.2, 98.1, 98.2, 98.4, 98.5, 55, 501/64, 73, 96.1, 96.5, 56; 252/62.51 R, 252/62.57, 62.58, 62.59, 62.64
See application file for complete search history.

(56) References Cited

U.S. PATENT DOCUMENTS

| | | | | |
|---|---|---|---|---|
| 3,676,343 A | * | 7/1972 | Dietz | .............. 508/155 |
| 4,304,602 A | | 12/1981 | Wusirika | |
| 4,608,352 A | * | 8/1986 | Laurent et al. | ............ 501/73 |
| 4,940,678 A | * | 7/1990 | Aitken | ................ 501/73 |
| 4,957,883 A | * | 9/1990 | Kobayashi et al. | ......... 501/35 |
| 5,006,142 A | * | 4/1991 | Weidner et al. | ........... 65/32.5 |
| 5,166,102 A | * | 11/1992 | Drouet et al. | ............ 501/9 |
| 5,455,211 A | | 10/1995 | McMillan et al. | |
| 5,518,970 A | * | 5/1996 | McMillan et al. | ......... 501/45 |
| 5,576,253 A | * | 11/1996 | Osafune et al. | .......... 501/56 |
| 6,242,132 B1 | | 6/2001 | Neudecker | |
| 6,329,309 B1 | * | 12/2001 | Kanamaru et al. | ........ 501/56 |

FOREIGN PATENT DOCUMENTS

| | | | |
|---|---|---|---|
| GB | 1489342 A | | 10/1977 |
| JP | 11-60265 | * | 2/1999 |
| JP | 2001214162 | * | 8/2001 |
| WO | WO 01/34530 A1 | | 5/2001 |

OTHER PUBLICATIONS

Schnick, Nitridosilicates, oxonitridosilicates (sions) and oxonitridoaluminosilicates (sialons) New materials with promising properties, . . . International Journal of Inorganic Materials, vol. 3, 2001, p. 1267-1272.

Esmaeilzadeh et al, Synthesis and structural investigations of La13Si18Al12O15N39, Solid State Sciences, vol. 5, 2003, p. 503-508.

Zhang et al, Grain Boundary devitrification of Ca a-sialon ceramics and its relation with the fracture toughness, Journal of Materials Science, vol. 38, 2003, p. 1359-1364.

* cited by examiner

Primary Examiner—Karl E Group
(74) Attorney, Agent, or Firm—Albihns AB

(57) ABSTRACT

A nitride glass with the general formula $\alpha_x\beta_y\gamma_z$ is provided wherein $\alpha$ is a glass modifier comprising at least one electropositive element. $\beta$ comprises Si, B, Ge, a and/or Al. $\gamma$ is N or N together with O, whereby the atomic ratio of O:N is in the interval from 65:35 to 0:100.

20 Claims, No Drawings

GLASS MATERIAL AND METHOD OF PREPARING SAID GLASS

CROSS REFERENCE TO RELATED APPLICATIONS

This application is a national stage application of International Application PCT/SE04/000034, filed Jan. 14, 2004, designating the United States of America, which claims the benefit of Swedish Patent Application No. 0300056-9, filed Jan. 14, 2003.

TECHNICAL FIELD

The invention relates to a nitride glass, a method for preparing a nitride glass and the use of the glass.

BACKGROUND OF THE INVENTION

Silicon nitride and sialon based materials are recognized as ceramics in high temperature engineering applications due to their high chemical and thermal stability combined with superior mechanical properties. In these systems, self-diffusion processes are relatively slow and they may require an oxide-sintering additive to provide conditions for liquid phase sintering. During sintering, the additive reacts with silica on the surface of the silicon nitride particles and some of the nitride forms an oxynitride liquid, which is converted into a glass phase during cooling. The composition and volume fraction of such oxynitride glass phases strongly influence the properties of the materials.

The glass forming regions have been investigated by many different researchers. The existence of sialon glass was first reported by K. H. Jack, J. Mat. Sci. Rev. 11 (1976) 1135-1158. T. H. Elmer, and M. E. Nordberg, J. Amer. Cer. Soc. 50 (1967) 275-279, introduced nitrogen into a high silica glass by heating the melt in $NH_3$ atmosphere. H. O. Mulfinger, J. Amer. Cer. Soc. 49 (1966) 462-467 produced nitrogen containing soda-lime glass by adding $Si_3N_4$ to the synthesis mixture. The effect of nitrogen concentration in silica glass on the hardness properties was studied by Shillito et al. Cer. Soc. 63 (1978) 537. It was suggested that the incorporation of $N_2$ into a silica glass affects the material properties due to the difference in the bonding strength of Si—N compared to Si—O.

By comparing Y-sialon glasses with $SiO_2$—$Y_2O_3$—$Al_2O_3$ glasses an increase in hardness could be pointed out by introducing nitrogen in the silica glass, where oxygen atoms are partly replaced by $N^{3-}$. The hardness of the glasses was increased with an increase of nitrogen content.

R. E. Loehman, J. Non-Crys. Solids 56 (1983) 123-134 disclosed that mixtures of oxides and nitrides could be melted and quenched to form glass. By introducing nitrogen into the oxosilicate glass, several material properties were improved, such as increase in the glass transition temperature, hardness, fracture toughness, elastic modulus and chemical durability.

The dissolution of nitrogen in oxosilicate melts was further studied by E. A. Dancy and D. Janssen, Canadian Metallurgical Quarter 15[2] (1976) 103-110, who reacted CaO—$Al_2O_3$—$SiO_2$ at 1550° C. in 1 atm. $N_2$ gas. The amount of 0.25 to 2.5 wt % nitrogen could be incorporated by this technique while as high as 4 wt % nitrogen was incorporated by dissolving solid $Si_3N_4$ in the melt. The nitrogen concentration in the melt is probably due to the strong and much favorable triple bond in the $N_2$ molecule.

Jack et al. disclosed bulk samples of oxynitride glass obtained by pressure-less heat treatment of a mixture of $14Y_2O_3$-$59SiO_2$-$27AlN$ in a boron nitride crucible at 1700° C. in nitrogen atmosphere. This sample was found to have a refractive index of 1.76 and a nitrogen concentration of 9 at % corresponding to an O:N ratio of 86:14.

Silicate glass is usually made from oxosilicates. The highest possible condensation degree in pure oxosilicates is found for $SiO_2$, wherein every oxygen atom is coordinated by two silicon atoms. It is possible to form glass from pure $SiO_2$.

This form of glass has been found to have many superior physical properties, such as a high melting point, good mechanical properties and transparency for UV photons. However, a high synthesis temperature is needed for the formation of $SiO_2$ glass. Glass modifiers such as $Na^+$, $K^+$ and $Ba^{2+}$ are added to $SiO_2$ in different concentrations in order to lower the melting temperatures and the manufacturing cost. By introducing glass modifiers, the network structure of $SiO_2$ is partially broken and some of the oxygen atoms are therefore connected only to one silicon atom. Oxygen atoms connected to only one silicon atom are called apex atoms and oxygen atoms connected to two silicon atoms are named bridging atoms. The three dimensional Si—O network in the glass can be maintained when only one out of four oxygen atoms of the $SiO_4$ tetrahedra are apex. At least three oxygen atoms must be bridging between two silicon atoms to get a three dimensional network.

This restriction of the condensation degree makes it possible to form oxosilicate glass only in the composition range $SiO_2$-$M_xSiO_{2.5}$. The highest concentration of the glass modifier can therefore only be x=1.0 for monovalent cations such as $Na^+$ and $K^+$, x=0.5 for divalent cations such as $Ba^{2+}$ and $Pb^{2+}$, x=0.333 for trivalent cations such as $La^{3+}$ and $Y^{3+}$ and x=0.25 for the four valent $Th^{4+}$.

The concept of introducing nitrogen into the glass chemistry has previously been used in sialon glasses. By quenching melts of M-Si—Al—O—N from high temperatures, glass phases of sialons with glass modifiers such as $La^{3+}$ and $Y^{3+}$ were obtained. The composition limit concerning Ln (lanthanide) content, which were used as the glass modifiers, and nitrogen content was reached with the composition $La_5Si_{10}Al_5O_{27.5}N_5$, described by N. K. Schneider, H. Lemercier and S. Hampshire, Materials Science Forum, 325-326 (2000) 265-270. This composition gives the highest lanthanum and nitrogen content ever obtained in a nitride based glass at ambient pressure. The cationic composition given in atomic percent is then La:25%, Si:50% and Al:25% and the anionic composition given in the same way is O:84.2% and N:15.8%. The synthesis technique used for preparation of such glasses has limited the nitrogen content as well as the glass modifier content (lanthanum in the example mentioned above).

Accordingly, the glass materials that are present today have a nitrogen content corresponding to the O:N ratio of 84.2:15.8. However, since demands for new glass materials having higher strength and improved physical properties in other respects, not least for various optical, ceramical and coating-technological applications, continuously are raised, it would be a great advantage to provide new materials with even better properties.

One oxonitride glass with higher lanthanum and nitrogen content has been disclosed by A. Makishima, M. Mitomo, H. Tanaka, N. Ii and M. Tsutsumi, Yogyo-Kyokai-Shi 88[11] (1980) 701, possible to synthesis only at high nitrogen pressure (30 atm.). The composition of this glass have been reported as $La_{19.3}Si_{20.0}O_{42.5}N_{18.2}$, corresponding to a La:Si ratio of 49:51 and an O:N ratio of 70:30.

W. Schnick et al. Chem., 9 (1999) 289 introduced a route for introducing nitrogen into the silicate chemistry other than the obvious reaction of the silicate melt with $N_2$ gas for synthesis of crystalline nitridosilicates, oxonitridosilicates and oxonitridoaluminosilicates, i.e. not glass materials, by using electropositive metals together with silicon diimide $(Si(NH)_2)$ in a radio frequency furnace. The above mentioned synthesis route was accordingly used only for producing crystalline phases.

The glass materials described above have certain limitations in chemical composition regarding both nitrogen content as well as concentration of glass modifiers. The chemical composition of such material is a crucial parameter defining the physical properties and for that reason also different possibilities in applications.

A problem with nitrogen containing glass today is that there are requirements for even better physical properties of glass than is known today. There are no known methods for increasing the nitrogen content of the glass and thereby try to improve its properties. The method of Makishima et al has yielded the highest known nitrogen-content, but that method has the disadvantage of requiring complicated equipment and is expensive.

SUMMARY OF THE INVENTION

It is the purpose of the present invention to provide a new glass material, and a method for its manufacturing, thereby solving the problems posed above and meeting the demands on this point.

The present invention is directed to overcoming the problems set forth above. This is achieved by producing nitride glass using electropositive elements in their metallic state, as nitrides or any other compound that would transform into metallic state or a nitride when heated in nitrogen atmosphere preferably together with silicon nitride and silicon oxide.

In a first aspect, the present invention relates to a nitride glass. The new glass material shows clearly surprising and excellent properties such as extremely high refractivity index and very good hardness values.

In a second aspect, the present invention relates to a method for preparing a nitride glass, without using high nitrogen pressure during the synthesis. A manufacturing method for nitride glasses is provided, wherein the nitrogen content is possible to be increased, compared to known glass material manufacturing methods. The atomic ratio of O:N is in the interval from 65:35 to 0:100.

In a third aspect the present invention relates to the use of a nitride glass in several different applications, e.g. in a surface coating for providing an improvement of mechanical properties on an object such as eye-glasses; in watches and as glaze on different ceramics; in synthetic gemstones; in fibre optics and other optical data transfer components; in an optical device, such as an optical lens; in a sintering additive for ceramic sintering; in bio-ceramics, such as an implant; in a magneto-optical device, wherein the glass modifier is at least one magnetic element such as Dy, Nd, Sm, Tb or Pr as well as a component in a CD and/or a DVD device.

Thus, due to the high nitrogen content of the glasses of the invention, unique features of improved mechanical properties are provided, such as a high hardness value, a high melting point, and improved physical properties such as a high refractivity index. Further, strong paramagnetic glasses can be obtained by using magnetic f-elements as glass modifiers, whereby high concentrations of the magnetic ions can be obtained.

DETAILED DESCRIPTION OF THE INVENTION

In the first aspect, the present invention relates to a nitride glass with the general formula $\alpha_x\beta_y\gamma_z$, wherein $\alpha$ is at least one electropositive element chosen from the group of alkali metals Na, K and Rb, alkaline earth metals Be, Mg, Ca, Sr and Ba, transition metals Zr, Hf, Nb, Ta, W, Mo, Cr, Fe, Co, Ni, Zn, Sc, Y, and La, main group elements Pb, Bi, and f elements Ce, Pr, Nd, Sm, Eu, Gd, Tb, Dy, Ho, Er, Tm, Yb, Lu, Th, Pa and U;

$\beta$ is chosen from the group of Si, B, Ge, Ga and Al; and $\gamma$ is N or N together with O, whereby the nitrogen content given as atomic ratio of O:N is higher than 65:35.

The atomic ratio of O:N is preferably higher than 65:35, more preferably higher than 41:59 and most preferably higher than 20:80.

A preferred embodiment is when $\alpha$ is La and $\beta$ comprises Si and the atomic ratio of O:N is in the interval from 65:35 to 0:100.

In a second aspect, the present invention relates to a method for preparing such a nitride glass comprising the steps of a) mixing chemicals corresponding to the desired composition by using $\alpha$ as a pure metal and/or the corresponding metal nitrides or metal hydrides or any other compound that transforms to the corresponding nitride in nitrogen atmosphere during the synthesis;

b) heating said compounds to at least 1000° C. in the presence of nitrogen gas, thereby obtaining a melt;

c) maintaining the temperature of step b) until the mixed chemical compounds have formed a homogenous melt; and d) cooling the melt to a temperature below the glass transition temperature and using a cooling rate, that is sufficient in order to obtain a glass phase.

The nitrogen gas is present as long as the sample has a temperature higher than 1000° C. in order to avoid dissociation or oxidation of the glass sample. The heating in step b, is obtained during 1 second to 60 hours.

The temperature in step c, is maintained until equilibrium is reached, preferably during 4 to 24 hours. The time will depend on various parameters, such as the furnace used in the process and the sample composition.

The synthesis temperature, or melting temperature, of step b and c is preferably above 1500° C. and more preferably above 1800° C., depending on the composition of the melt. Even higher temperatures could be used Standard furnaces could be used in the method for preparing a nitride glass according to the present invention. However, it is important, that the furnace can operate at the temperatures from room temperature to 2000° C. In the examples presented below, a graphite furnace was used. Other furnaces which one could achieve equally high temperatures, with the possibility of quenching the samples, in nitrogen atmosphere can also be used.

The skilled person would know what type of crucible material to choose since the temperature of the melt can be above 1500° C. The material used in the crucible should be inert to the melt at temperatures at least above the synthesis temperature used depending on the glass. Thus, the compounds used in the method should be placed in a crucible made of a material such as niobium, tungsten, molybdenum, tantalum or boron nitride. These materials are possible to use due to their high melting points as well as being rather inert to the melted samples formed in the synthesis route. So far the inventor has tried niobium, tungsten, molybdenum and tantalum as well as boron nitride. In the case of BN a small reaction could be observed between the melt and the crucible. This shows at the same time that BN can be introduced in the nitride based glass.

New nitride glasses can by using this new synthesis approach be produced with a large variety of chemical compositions. $\alpha$ is the glass modifier, or the element that is not involved in the network structure, $\beta$ is the cation that together with the anion $\gamma$ form the network structure. The ratio $\alpha:\beta$ is in the interval from 30:70 to 60:40, preferably 51:49 to 60:40, depending upon the composition. The ratio $\beta:\gamma$ is in the interval from 33:67 to 22:88. The atomic ratio of O:N is in the interval from 84:16 to 0:100, preferably in the interval from 65:35 to 0:100. When $\alpha$ is La and the atomic ratio of O:N is in the interval from 65:35 to 0:100.

Anions that can serve as γ atoms are $O^{2-}$ and $N^{3-}$. The anion $C^{4-}$ also can be mixed with $N^{3-}$ or with a mixture of $O^{2-}$ and $N^{3-}$ and serve as γ atoms.

The glass according to the invention has a hardness value above 5 Gpa, preferably above 9.9 Gpa and more preferably above 12.3 Gpa.

All of the obtained glasses showed hardness values above 5.0 Gpa, and the highest obtained hardness value was 13.0 Gpa. As an example, one material, with the composition $La_{4.8}Si_{5.2}O_{5.6}N8.0$, showed a hardness value above 10.6 Gpa. The hardness can be further improved by thermal treatment, in order to relieve internal stresses of the quenched glass, and by optimisating of the chemical compositions.

The glass according to the invention has a refractivity index above 1.4, preferably above 1.9 and more preferably above 2.2. The highest refractivity index yet disclosed for a silicate glass, was observed for the glass material of the invention. The obtained glasses according to the invention has a refractivity index above 1.4 and at least one of the glasses, with the composition $La_{4.8}Si_{5.2}O_{5.6}N_{8.0}$, showed a refractivity index of 2.20. By optimisating the chemical composition, especially with respect to the glass modifiers further improvement of the refractivity index can be expected.

Glasses with magnetic or magneto-optic properties can be obtained wherein the glass modifier, α, is a magnetic element such as Ce, Pr, Nd, Sm, Eu, Gd, Tb, Dy, Ho, Er, Tm, Yb, Lu, Pa, U and Mn. By using these elements in the synthesis, elements with known strong paramagnetic field are introduced in the glass according to the invention. The synthesis and analysis of one of those oxonitride glasses containing a magnetic element is described in example 3 for the sample with the composition $Sm_{5.8}Si_{4.2}O_{6.0}N_{7.4}$.

Elements such as silicon, aluminium and boron, together with oxygen and nitrogen, form the network structure of the glass. Other elements usually with higher ionic radii and higher coordination numbers are named glass modifiers. The elements usually used as glass modifiers in oxosilicate glass are sodium, lithium, potassium, calcium, strontium, barium, lanthanides, lead, bismuth and tin. The elements that are most suitable as glass modifiers in nitride based glass are alkali metals, alkaline earth metals, rare earth metals and in some cases transition metals.

Another reason that makes some glass modifiers more suitable than others is their vapor pressure at higher temperatures. If alkali metals such as Na, K and Rb are used as glass modifiers it is preferable to use the glass modifier in excess, since evaporation of the alkali metal can occur, and/or applying higher nitrogen pressure in order to prevent possible evaporation of the alkali metal. The vapor pressure of the alkali metal decreases with decreasing atomic number.

A further aspect of the present invention is a nitride glass which possesses magnetic and/or magneto-optic properties according to the second aspect of the present invention, wherein the glass modifier, α, is at least one magnetic element such as Ce, Pr, Nd, Sm, Eu, Gd, Tb, Dy, Ho, Er, Tm, Yb, Lu, Pa and U.

The syntheses of nitrogen rich silicate glass were performed using mixtures of α metals, $Si_3N_4$, $SiO_2$, AlN and BN. The metals used in the synthesis procedure are electropositive and react with the $N_2$ gas used to form nitrides. Elements such as Ba is probably transformed to different nitrides and subnitrides and most of the rare earth metals transform to LnN stoichiometric compounds.

The β atoms are inserted in the mix in step a) as a chemical compound in the form of nitrides and oxides such as $Si_3N_4$, $SiO_2$, AlN and BN. The Si-base could be $Si_3N_4$, $Si(NH)_2$, Si, $SiO_2$ and other Si-based compounds that transforms to $Si_3N_4$ in $N_2$-atmosphere at temperatures below 1600° C. The Al-base could be AlN, $Al_2O_3$, Al, and other Al-based compounds that reacts to form AlN in $N_2$-atmosphere at temperatures below 1600° C. The B-base could be BN, elemental B, $B_2O_3$, $H_2B_2O_3$ and other B-based compounds transforming to BN at temperatures below 1600° C. The γ atoms would also be added in the mixture as nitrides and/or oxides of the compounds mentioned above. Further, γ could also be added in the mixture in the form of $N_2$ gas.

Any electropositive element can be used as glass modifier, α is preferably chosen from the group of Be, Na, K, Rb, Zr, Hf, Nb, Ta, W, Mo, Cr, Fe, Co, Ni, Zn, Pb, Bi Lu, Mg, Y, Sc, Nd, Gd, Eu, Er, Tb, Tm, Dy, Yb, Th, Pa, U, Ca, Sr, Ba, La, Pr, Ce, Sm, Mn and Ho. Further, α is more preferably chosen from the group of Lu, Mg, Y, Sc, Nd, Gd, Eu, Er, Tb, Tm, Dy, Yb, Th, Pa, U, Ca, Sr, Ba, La, Pr, Ce, Sm, Mn and Ho. Yet further, α is most preferably chosen from the group of Ca, Sr, Ba, La, Pr, Ce, Sm, Mn and Ho.

The above mentioned elements could be used in the synthesis as an electropositive metal, or a nitride comprising an electropositive metal, or a compound comprising an electropositive element that would transform into metallic state or a nitride when heated in nitrogen atmosphere. This means that La can be incorporated in LaN. Examples of such precursor materials are La metal, Ba metal, NdN, $CaH_2$, etc.

The α atoms are usually introduced in their metallic form which are converted to nitrides in $N_2$ atmosphere. γ are the anions in the glass network and are nitrogen or nitrogen together with oxygen with a composition that is dependent of the original chemical compositions used.

By heating a composition comprising the electropositive metals, the main group element nitrides, and/or oxides, in nitrogen atmosphere and at high temperatures, a melt with a specific chemical composition can be obtained, i.e. the electropositive metal is oxidised by the $N_2$ molecule and reacted with the main group element nitrides and/or oxides and a nitride or oxonitride melt is eventually formed. This melt then contains cations of the glass modifiers e.g. $Ba^{2+}$, $La^{3+}$, $Sm^{3+}$, $Gd^{3+}$, $Dy^{3+}$ and a network structure composed of $Si(O,N)_4$ tetrahedra, $Al(O,N)_4$ tetrahedra and $B(O,N)_3$ trigonal building blocks in different ratio depending on the original composition of the mixture used. It is reasonable to assume that the anions (O,N) are apex atoms $X^{[1]}$ (bound with one Si atom) or bridging $X^{[2]}$ (bound with two Si atoms) atoms and in some cases they are isolated ions with chemical bonds only to the glass modifier ions as $X^{[0]}$ (no bound Si atom).

The synthesis mechanism could be analysed by trying different synthesis parameters such as time and temperature. The first part of the synthesis process is the nitridation of the electropositive metal, α, which could be used as glass modifier according to the formula below, herein α is La:

$$2La(s)+N_2(g) \Rightarrow 2LaN(s)$$

This reaction occurs at temperatures far below 1000° C., and is in principle the only reaction that takes part at these low temperatures. At higher temperatures, typically above 1500° C., the LaN starts to react with $Si_3N_4$ and $SiO_2$ and depending on the synthesis mixture, a melt is formed at a certain temperature. As soon as a partial melt is formed, the kinetic of the reaction increases significantly and the melt continues to dissolve rather inert nitrides such as $Si_3N_4$, AlN and BN. At this stage, the synthesis mixture has formed a complete melt and the composition of the melt defines the viscosity and the structure of the melt which is important for the glass transition temperature and the cooling rate needed in order to obtain an amorphous solid.

The melt can now be quenched to a temperature below the glass transition temperature. The quenching can be performed in many different ways. One way is to transferring the melted sample to a colder chamber, while a much more efficient cooling rate can be obtained by pouring the melted sample on a cold metal surface, e.g. water cooled copper plate. In order to release the internal stresses, that can be present in a quenched sample, the glass can be thermally treated at a temperature below the glass transition temperature. Such thermal treatment could give better mechanical properties.

The obtained glass materials show very good thermal stability and are stable up temperatures as high as 1000-1500° C. depending on the composition of the glass. The crystallisation process of the glass materials starts typically at ca. 1200° C.

In the present invention, the chemicals have been stored and mixed together in an argon filled glove box, in order to avoid oxidation of air and moisture sensitive chemicals such as Ln-metals. The chemicals for every synthesis is weighted, mixed and grinded in the glove box and then transferred to a self made niobium crucible and then sealed with an air-tight plastic para-film. Many other crucibles that are inert to the melt formed and the precursor materials used can also be used. The filled niobium crucible is transformed to the graphite furnace used for these syntheses. The graphite furnace has two chambers. The upper chamber is the hot part of the furnace where the synthesis is made and the lower part of the furnace is the cooler part where to the sample is lowered to in order to quench the system to lower temperatures for fast solidification of the oxonitride melt. The furnace is typically flushed three times with nitrogen gas before the heating program is started. The syntheses are always performed in nitrogen gas atmosphere. The sample is heated up to the desired temperature, it could take from 1 second to 60 hours, typically within 2-4 hours, it is kept at a plateau from 1 second to 60 hours, typically during 4 to 24 hours in order to get a complete reaction and all of the involved chemicals dissolved in the melt. The short time could be achieved when the sample powder is quickly heated until a melt is obtained, e.g. by pouring a powder sample with high homogeneity through a hot zone of a furnace whereby a melt is obtained which can quickly be cooled to a glass phase at a cooler part of the furnace. Finally, the furnace is shut down and the sample lowered to the cooler part of the furnace. The sample is taken out of the furnace when it has reached room temperature. The niobium crucible is removed from the solidified melt and the glass samples can be used for different analyses. Other furnaces that can provide temperatures between room temperature and about 2000° C. together with the use of nitrogen gas can also be used for the above mentioned synthesis purpose. The possibility of quenching the sample below the glass transition temperature is also an important feature for a furnace which could be used for the synthesis of the invented glass.

The chemicals that can be used for the synthesis of nitride glass are for example $Si_3N_4$, $SiO_2$, $AlN$, $Al_2O_3$, $BN$, $B_2O_3$ and metals such as rare earth metals, alkaline metals and alkaline earth metals. The precursor materials can be changed in a various ways. The most important thing is to obtain the nitrides that are needed in the reaction at a higher temperature when the melt is formed. The goal is to get the right oxygen/nitrogen composition in the final melt that is quenched to form the glass phase.

An especially preferred glass is when a comprises La and β comprises Si.

In a third aspect, the glass material of the invention can be used in a variety of applications.

A first embodiment of the third aspect of the present invention is as a surface coating for providing improvement of mechanical properties on an object such as eye-glasses, watches and as glaze, with desired colors, on different ceramics.

A second embodiment of the third aspect of the present invention is as synthetic gemstones. The combination of high refractivity index and the possibility of coloring the glass material by using different f-elements, together with good mechanical properties makes this novel glass type a good material for usage as synthetic gemstones.

A third embodiment of the third aspect of the present invention is as magneto-optical device wherein A is at least one magnetic element such as Ce, Pr, Nd, Sm, Eu, Gd, Tb, Dy, Ho, Er, Tm, Yb, Lu, Pa, U and Mn. High concentrations of strongly magnetic elements makes this novel glass type very suitable as magneto-optical components for usage in CD and/or DVD technology. The Verdet coefficient is the parameter which defines the Faraday rotation or magneto-optic effect, which is the rotation of the plane of polarized light passing through a material when that material is exposed to an external magnetic field. The Verdet coefficient of a glass varies linearly with concentration for mixtures of different rare earth ions and since much higher concentrations of rare earth ions can be incorporated in this novel glass type compared to traditional oxosilicate glasses, the Verdet constant is expected to be much larger for the title glass with magnetic rare earth ions.

A fourth embodiment of the third aspect of the present invention is as fiber optics as well as other optical data transfer components. This can be achieved due to the high refractivity index in the novel glass, as high as 2.20.

A fifth embodiment of the third aspect of the present invention is as optical devices such as optical lenses. One of the most important physical properties desired for production of optical lenses is high refractivity index. The novel glass compound has the highest refractivity index ever observed for silicate glass (n=2.20). Typical values for refractivity index in ordinary oxosilicate glass is n≈1.4. The extremely high refractivity index of the invented glass is probably due to high concentrations of highly Polaris able ions such as $La^{3+}$ and/or $Ba^{2+}$, which easily can be obtained by this new synthesis procedure.

A sixth embodiment of the third aspect of the present invention is as sintering additives for ceramic sintering. The properties of the glass found in the grain boundaries of sialons is crucial for the mechanical properties of the ceramics. Since this novel glass possesses good mechanical properties such as high hardness as well as high thermal stability it would be favorable in usage as sintering additives for sialons as well as other nitrides and oxonitrides.

A seventh embodiment of the third aspect of the present invention is its usage as bioceramics, such as an implant. This novel glass can be used in composite materials, together with other compounds, for usage as bioceramics in different implants. It is favorable due to low chemical reactivity in combination with good mechanical properties.

EXAMPLES

In the following the invention will be described in more detail by means of examples which are provided for illustrative purposes only and are not intended to limit the scope of the invention.

The samples were examined using scanning electron microscopy in combination with EDX analysis, X-ray powder diffraction for confirmation of the amorphous state of the samples, hardness measurements by indentation experiments, determination of the refractivity index by measuring the Brewster angle, chemical analysis of the oxygen and nitrogen content, oxidation behavior, and magnetic susceptibility.

The samples to be analysed in the electron microscope were mounted in bakelite, polished and carbon coated in order to avoid local charges. The microstructures and the metal compositions were analysed in a JEOL JSM 820 equipped with a LINK AN10000 EDX analyzer system.

A focusing Huber Guinier 670 X-ray camera with a CuKα radiation source was used for detecting the existence or proving the absence of crystalline phases in the glass samples. The XRPD patterns were collected in the 2θ range 4-100° with a step size of 0.005°. The powdered samples were mounted on a spinning tape.

The hardness of the new glass materials were analysed using Vickers hardness measurements. A pyramidal diamond indenter with an applied load of 1000 grams was used. Three to five indentations were performed on each specimen. The samples were examined afterwards by light microscope and the diagonal lengths of the indentations were measured. The mean diagonal average length of each indentation was used for the calculation of the Vickers hardness using the following formula:

$$Hv = (1854 \text{ kgf.}\mu m^2/gf.mm^2) F/d^2$$

where F is the test load in grams and d is the mean diagonal length of the indentation, expressed in microns. A test load of 1000 grams and a mean diagonal length of the indentation of 40 μm would give a hardness value of Hv=1159 kgf/mm2. The Vickers hardness can be converted into SI units by the following formula:

$$H = Hv \text{ kgf/mm}^2 [(9.807 \text{ N/kgf})/(10^{-6} \text{ m}^2/\text{mm}^2)]$$

where H is the hardness in Pa.

The oxygen/nitrogen content was analysed using a Leco Detector (TV-436DR) chemical analysis equipment. The glass samples were analysed using a combustion technique. By heating the sample in a graphite crucible oxygen and nitrogen atoms leave the sample as gaseous species. The oxygen atoms react with the graphite crucible and forms carbon dioxide and is analysed by measuring the infrared absorption. The nitrogen atoms leave as $N_2$ molecules and is analysed by measuring the thermal conductivity.

One of the most important properties of amorphous materials is the propagation of light through the solid and the change of direction of light between two different media. These properties can be defined by the refractivity index of the material given at a certain wavelength. The refractivity index can be measured by different techniques. The technique used for these glasses is the measurement of the Brewster angle. The angle between the incident and reflected light where the maximum polarization occurs is called the Brewster angle or polarizing angle $\alpha_B$. The relationship between the Brewster angle and the refractivity index is given by the equation:

$$\tan(\alpha_B) = n$$

where n is the refractivity index.

Example 1

Synthesis of Oxonitride Glass with the Composition $La_{4.8}Si_{5.2}O_{5.6}N_{8.0}$ and its Optical and Mechanical Properties A mixture of La metal, $SiO_2$ and $Si_3N_4$ was weighted and carefully grinded in an argon filled glove box. The composition of the mixture used was 615.4 mg La, 177.4 mg $SiO_2$ and 207.2 mg $Si_3N_4$. The grinded mixture was transferred to a niobium tube with one end sealed. The niobium tube was then covered by para-film in order to avoid oxidation of La metal by air when transported to the graphite furnace. The furnace was flushed with nitrogen gas three times before the heating program was started. The sample was heated up to 1750° C. from room temperature during 2 hours, kept at this temperature for 22 hours and finally quenched by lowering the sample to the cold part of the furnace. After the furnace temperature was lowered to room temperature the sample was removed from the furnace chamber.

5 mm large pieces of the obtained glass sample were used for EDX analysis and measurements of the refractivity index as well as hardness measurements. The metal composition obtained from the EDX analysis of a polished and carbon coated surface were found to be 48(±1 sdv) at % La and 52(±1 sdv) at % Si. This result indicates a minor loss of silicon during the synthesis due to the relative high temperature and long tempering time. The O:N composition was found to be 41:59, which together with the EDX analysis gives the overall chemical composition of $La_{4.8}Si_{5.2}O_{5.6}N_{8.0}$. Both scanning electron micrographs as well as X-ray powder diffraction experiments revealed a homogenous glass sample, free of any crystalline phases.

The refractivity index was found to be n=2.20(7) calculated from the measured Brewster angle 65.6°. This extremely high value of the refractivity index is the highest value ever found for a silicate based glass. The indentation experiments used for the hardness testing resulted in a hardness value of 10.6 Gpa for the above mentioned sample.

Example 2

Synthesis of Oxonitridaluminosilicate Glass with the Composition $La_{4.6}Si_{3.3}Al_{2.2}O_{9.3}N_{5.0}$ and its Optical and Mechanical Properties The glass sample with the composition $La_{4.6}Si_{3.3}Al_{2.2}O_{9.3}N_{5.0}$ was synthesized by mixing 787.6 mg La metal, 360.5 mg $SiO_2$, 122.9 mg AlN and 46.8 mg $Si_3N_4$ thoroughly in an argon filled glove box. The reaction mixture was then transferred into a niobium tube with one sealed end, which was covered with para-film in order to avoid oxidation of La metal by air while transporting it to the graphite furnace for heat treatment.

The graphite furnace was flushed with nitrogen gas three times before starting the heat treatment. The sample was heated up to 1750° C. from room temperature during 2 hours, held at this temperature for 30 hours and quenched by lowering the sample to the cool chamber of the graphite furnace. The obtained glass sample was removed from the graphite furnace when it had reached room temperature, and cut into ~5 mm large pieces for further polishing and used for different analyses purposes.

Scanning electron micrographs as well as X-ray powder diffraction patterns unambiguously showed a homogenous glass sample with no traces of crystalline phases. The EDX analysis of a carbon coated polished surface gave the following metal composition: 46(±1 sdv) at % La, 33(±1 sdv) at % Si and 22(±1 sdv) at % Al. The O:N composition was found to be 65:35, which together with the metal composition gives a chemical stoichiometry of $La_{4.6}Si_{3.3}Al_{2.2}O_{9.3}N_{5.0}$. The refractivity index calculated from the measured Brewster angle was found to be 1.95(2), which corresponds to a Brewster angle of 62.8°. The hardness value obtained from the indentation experiments was 10.3 Gpa.

Example 3

Synthesis of the Oxonitride Glass with the Composition $Sm_{5.8}Si_{4.2}O_{6.0}N_{7.4}$ and its Optical, Mechanical and Magnetic Properties A batch of 1.0 gram mixture containing Sm, $Si_3N_4$ ($SiN_{4/3}$) and $SiO_2$ with the molar ratio of $Sm:SiN_{4/3}:SiO_2$ corresponding to 7.33:5:5. The mixture was thoroughly grinded in an argon filled glove box transferred to a niobium tube with one sealed end and heat treated in a graphite furnace in nitrogen atmosphere. The mixture was heated up to 1750° C. during two hours, held at this temperature for 22 hours and then quenched to a temperature below the glass transition temperature by lowering the sample to the colder chamber of the graphite furnace. The sample was removed from the furnace when it was cooled down to room temperature and 5 mm large pieces were cut out for different analyses.

Scanning electron micrographs as well as X-ray powder diffraction patterns unambiguously showed a homogenous glass sample with no traces of crystalline phases. The EDX analysis of a carbon coated polished surface gave the following metal composition: 58($\pm$1 sdv) at % Sm and 42($\pm$1 sdv) at % Si. The O:N composition was assumed to be the same as found for the corresponding lanthanum containing glass, which would give an O:N ratio of 45:55. The O:N composition together with the metal composition gives a chemical stoichiometry of $Sm_{5.8}Si_{4.2}O_{6.0}N_{7.4}$. The refractivity index calculated from the measured Brewster angle was found to be 2.03(2), which corresponds to a Brewster angle of 63.8°. The hardness value obtained from the indentation experiments was 11.4 Gpa. The magnetic susceptibility measurements gave a paramagnetic signal and temperature dependence typical for $Sm^{3+}$ containing samples. $Sm^{3+}$ is a magnetic ion, thereby showing that high concentrations of the magnetic ions can be obtained. The susceptibility curve agreed well with the temperature dependent susceptibility found for $Sm_2O_3$.

Example 4

Synthesis of the Oxonitridoborosilicate with the Nominal Composition $La_{5.7}Si_{6.5}B_{1.5}O_{12}N_{7.85}$ A mixture of 1.5752 g La metal, 0.721 g $SiO_2$, 0.0468 g $Si_3N_4$ and 0.075 g BN was thoroughly grinded in an argon filled glove box. The grinded mixture was transferred to a self made niobium crucible. The crucible was covered with parafilm and transported to a graphite furnace for thermal treatment. The graphite furnace was flushed with nitrogen gas three times before starting the heat treatment program. The sample was then heated to 1600° C. during 2 hours, held at this temperature for 30 hours, the temperature was then raised to 1750° C. and held at this ramp for 1 hour before quenching to a temperature below the glass transition temperature by lowering the sample to the colder furnace chamber. The sample was removed from the furnace when the room temperature was reached and 5 mm large pieces were cut out for different analyses.

Scanning electron micrographs as well as X-ray powder diffraction patterns unambiguously showed a homogenous glass sample with no traces of crystalline phases. The above mentioned analysis show clearly that the BN powder also was dissolved in the glass sample and is therefore integrated in the amorphous glass structure.

The results clearly shows that the physical and mechanical properties of oxide glasses such as hardness, elastic modulus, fracture toughness, and glass transition temperature are improved/increased, when the atomic structure of the network is strengthened by replacing oxygen atoms by nitrogen atoms. Further, the results shows that a very high refractivity index could be achieved.

Further Examples

Chemical composition of investigated glasses is shown below. All compositions were melted at 1750° C. for 22 hours. G indicates that glass is formed and C indicates that also a crystalline phase is present.

| Ex No. | Specimen No. | Chemical formula | Pr | $SiO_2$ | $Si_3N_4$ | B (Amorphous) |
|---|---|---|---|---|---|---|
| 5 | Pr2$^{(G+C)}$ | $Pr_{6.33}Si_{10}O_7N_{15}$ | 0.6343 g<br>38.76 wt % | 0.1495 g<br>21.43 wt % | 0.2162 g<br>39.80 wt % | — |
| 6 | Pr3$^{(G+C)}$ | $Pr_{8.33}Si_{10}O_7N_{17}$ | 0.6953<br>45.44 | 0.1246<br>19.09 | 0.1801<br>35.46 | — |
| 7 | Pr4$^{(G)}$ | $Pr_{3.33}Si_{10}O_{10}N_{10}$ | 0.4676<br>24.98 | 0.2994<br>37.51 | 0.2330<br>37.51 | — |
| 8 | Pr5$^{(G)}$ | $Pr_{7.33}Si_{10}O_{10}N_{14}$ | 0.6591<br>42.30 | 0.1917<br>28.85 | 0.1492<br>28.85 | — |
| 9 | Pr5B$^{(G)}$ | $Pr_{7.33}Si_{10}O_{10}N_{14}$ + B | 0.6591<br>42.30 | 0.1917<br>28.85 | 0.1492<br>28.85 | 0.0150 wt. %<br>age 1.5 |
| 10 | Pr8$^{(G+C)}$ | $Pr_{7.67}Si_{10}O_9N_{15}$ | 0.6719<br>43.41 | 0.1681<br>25.47 | 0.1599<br>31.13 | — |
| 11 | Pr10$^{(G)}$ | $Pr_8Si_{10}O_8N_{16}$ | 0.6839<br>44.44 | 0.1458<br>22.22 | 0.1703<br>33.33 | — |
| 12 | Pr14$^{(G+C)}$ | $Pr_{6.67}Si_{10}O_6N_{16}$ | 0.6493<br>40.01 | 0.1245<br>18.00 | 0.2262<br>41.99 | — |
| 13 | Pr15$^{(G)}$ | $Pr_{7.33}Si_{10}O_7N_{16}$ | 0.6676<br>42.30 | 0.1359<br>20.20 | 0.1965<br>37.50 | — |

| Example No. | Specimen | Chemical formula |
|---|---|---|
| 14 | Glass | $La_{4.33}Si_{10}O_7N_{13}$ |
| 15 | Glass | $La_{6.33}Si_{10}O_7N_{15}$ |
| 16 | Glass | $La_4Si_{10}O_8N_{12}$ |
| 17 | Glass | $La_6Si_{10}O_8N_{12}$ |
| 18 | Glass | $La_{7.67}Si_{10}O_9N_{15}$ |

| Example | Specimen No. | Chemical formula | La | | $SiO_2$ | $Si_3N_4$ |
|---|---|---|---|---|---|---|
| 19 | P1$_{(G)}$ | $La_{3.33}Si_{10}O_{10}N_{10}$ | wt % | 46.43 | 30.13 | 37.45 |
| | | | mol % | 24.98 | 37.51 | 37.51 |
| 20 | P2$_{(G)}$ | $La_{5.33}Si_{10}O_{10}N_{12}$ | wt % | 58.09 | 23.57 | 18.35 |
| | | | mol % | 34.79 | 32.61 | 32.61 |
| 21 | P3$_{(G)}$ | $La_{7.33}Si_{10}O_{10}N_{14}$ | wt % | 65.59 | 19.35 | 15.06 |
| | | | mol % | 42.30 | 28.85 | 28.85 |
| | | | mol % | 16.21 | 59.46 | 24.32 |

-continued

| Example No. | Specimen No. | Chemical formula | La | | SiO$_2$ | Si$_3$N$_4$ |
|---|---|---|---|---|---|---|
| 22 | P5$_{(G)}$ | La$_5$Si$_{10}$O$_{11}$N$_{11}$ | wt % | 56.22 | 26.75 | 17.07 |
| | | | mol % | 24.39 | 53.66 | 21.95 |
| 23 | P6$_{(G)}$ | La$_7$Si$_{10}$O$_{11}$N$_{13}$ | wt % | 64.25 | 21.84 | 13.91 |
| | | | mol % | 31.11 | 48.89 | 20.00 |
| | | | mol % | 21.07 | 47.36 | 31.57 |
| 24 | P8$_{(G)}$ | La$_{4.67}$Si$_{10}$O$_{12}$N$_{10}$ | wt % | 54.23 | 30.14 | 15.64 |
| | | | mol % | 31.83 | 40.90 | 27.27 |
| 25 | P9$_{(G)}$ | La$_{6.67}$Si$_{10}$O$_{12}$N$_{12}$ | wt % | 62.85 | 24.45 | 12.69 |
| | | | mol % | 40.01 | 35.99 | 24.00 |
| | | | mol % | 20.79 | 62.41 | 16.80 |
| 26 | Q3$_{(G,c)}$ | La$_{6.33}$Si$_{10}$O$_{13}$N$_{11}$ | wt % | 61.34 | 27.24 | 11.42 |
| | | | mol % | 27.73 | 56.94 | 15.33 |

Chemical composition of investigated glasses is shown below. All compositions were melted at 1500° C. for 18 hours, and then increased the temperature at 1750° C. for 30 min. and hold at this temperature for 30 min. and quenched to room temperature in a cold chamber of furnace, under the flow of nitrogen gas.

| Example No. | Specimen No. | Chemical formula | La | | SiO$_2$ | Si$_3$N$_4$ |
|---|---|---|---|---|---|---|
| 27 | EISO1 (G) | La$_{4.33}$Si$_{10}$O$_7$N$_{13}$ | wt % | 53.90 | 18.85 | 27.24 |
| | | | mol % | 24.12 | 39.26 | 36.45 |
| 28 | EISO2 (G) | La$_{6.33}$Si$_{10}$O$_7$N$_{15}$ | wt % | 63.10 | 15.09 | 21.80 |
| | | | mol % | 31.94 | 35.30 | 32.78 |
| 29 | EISO5 (G) | La$_{7.67}$Si$_{10}$O$_9$N$_{15}$ | wt % | 66.88 | 16.97 | 16.14 |
| | | | mol % | 34.60 | 40.59 | 24.81 |
| 30 | SISO1 (G + C) | La$_{5.33}$Si$_{10}$O$_4$N$_{16}$ | wt % | 59.83 | 09.77 | 30.41 |
| | | | mol % | | | |

-continued

| Example No. | Specimen No. | Chemical formula | La | | SiO$_2$ | Si$_3$N$_4$ |
|---|---|---|---|---|---|---|
| 31 | PISO1 (G) | La$_{7.33}$Si$_{10}$O$_{10}$N$_{14}$ | wt % | 65.59 | 19.35 | 15.06 |
| | | | mol % | 42.30 | 28.85 | 28.85 |

Chemical composition of investigated glasses is shown below. All compositions were melted at 1700° C. and 1200° C. for 19.5 hours (the compositions were melted at 1700° C. for (2+12) hours and than at 1200° C. for 4 hours and than last run was done at 1700° C. for 1.5 hours).Basis of one gram. Partially glass is indicated when a glass phase is formed and some of the resulted material is crystalline. The crystals are incorporated in the glass mass. There is about 30-80 volume percent glass in the below mentioned synthesis examples.

| Ex. No. | Sp No. | Chemical formula | wt % Ca | SiO$_2$ | Si$_3$N$_4$ | Results |
|---|---|---|---|---|---|---|
| 32 | Ca 1B | Ca$_9$Si$_{10}$O$_{14}$N$_{10}$ | 39.14 | 45.64 | 15.22 | G |
| 33 | Ca 2B | Ca$_{9.5}$Si$_{10}$O$_{13}$N$_{11}$ | 40.74 | 41.79 | 17.48 | G |
| 34 | Ca 3B | Ca$_{10}$Si$_{10}$O$_{12}$N$_{12}$ | 42.28 | 38.03 | 19.69 | G |
| 35 | Ca 4B | Ca$_{10.5}$Si$_{10}$O$_{11}$N$_{13}$ | 43.77 | 34.38 | 21.85 | G |
| 36 | Ca 5B | Ca$_{12}$Si$_{10}$O$_{10}$N$_{14}$ | 47.39 | 29.60 | 23 | G |
| 37 | Ca 6B | Ca$_5$Si$_{10}$O$_{10}$N$_{10}$ | 27.30 | 40.91 | 31.79 | G + C |
| 38 | Ca 7B | Ca$_{4.5}$Si$_{10}$O$_{11}$N$_9$ | 25.02 | 45.85 | 29.13 | G + C |
| 39 | Ca 8B | Ca$_4$Si$_{10}$O$_{12}$N$_8$ | 22.66 | 50.95 | 26.38 | G + C |
| 40 | Ca 9B | Ca$_{3.5}$Si$_{10}$O$_{13}$N$_7$ | 20.21 | 56.26 | 23.53 | G |
| 41 | Ca10B | Ca$_3$Si$_{10}$O$_{14}$N$_6$ | 18.14 | 63.46 | 21.12 | G + C |

Samples were melted at 1750° C. for 30 hours, and then subsequently cool to room temperature (inside of the furnace under the flow of N$_2$).

| Ex No. | Specimen No. | Chemical formula | La | | SiO$_2$ | AlN | Si$_3$N$_4$ |
|---|---|---|---|---|---|---|---|
| 42 | A2 (G) | La$_{5.67}$Si$_7$Al$_3$O$_{12}$N$_{10}$ | wt(gm) | 0.7876 | 0.3605 | 0.1229 | 0.0468 |
| | | | mol % | 36.18 | 38.29 | 19.14 | 06.38 |

NB. All above composition were melted in graphite holder (small in size) and samples were inside of the Nb. Tube as well as during cooling N$_2$ were insert through lower\cold chamber instead of hot chamber.

Sample SmE3, SmP9, GdE3 and GdP9 were melted at 1750° C. for 22 hours and SmA2 and GdA2 were melted at 1750° C. for 30 hours, subsequently cool to room temperature (inside of the furnace under the flow of N$_2$) See note.

| Ex. No. | Spec. No. | Chemical formula | Sm | | Gd | SiO$_2$ | AlN | Si$_3$N$_4$ |
|---|---|---|---|---|---|---|---|---|
| 43 | SmP9 (G) | Sm$_{10}$Si$_{10}$O$_{12}$N$_{12}$ | wt(gm) | 1.5036 | — | 0.3605 | — | 0.1871 |
| | | | mol % | 50.00 | — | 30.00 | — | 20.00 |
| 44 | GdP9 (G + C) | Gd$_{6.67}$Si$_{10}$O$_{12}$N$_{12}$ | wt(gm) | — | 1.0483 | 0.3605 | — | 0.1871 |
| | | | mol % | — | 40.01 | 35.99 | — | 23.99 |

NB. All above composition were melted in graphite holder (small in size) and samples were inside of the Nb. Tube as well as during cooling $N_2$ were insert through lower\cold chamber instead of hot chamber.

Samples were melted at 1750° C. for 22 hours, subsequently cool to room temperature (inside of the furnace under the flow of $N_2$) See note.

| Ex. No. | Series No. | Chemical formula | Sm wt. in grams | Gd | La | $SiO_2$ | AlN | $Si_3N_4$ |
|---|---|---|---|---|---|---|---|---|
| 45 | SmP3 (G) | $Sm_{11}Si_{10}O_{10}N_{14}$ | wt 1.6539 mol % 52.39 | — — | — — | 0.3004 23.81 | — — | 0.2338 23.81 |
| 46 | Gd1 (G + C) | $Gd_{2.67}Si_{10}O_{12}N_8$ | wt — mol %— mol % 44.44 | 0.4198 21.07 — | — — — | 0.3605 47.36 33.33 | — — 16.22 | 0.1871 31.58 22.22 |
| 47 | La1 (G) | $La_{6.33}Si_9Al_1O_{14}N_{10}$ | wt — mol %— | — — | 0.8793 38.76 | 0.4206 42.86 | 0.0409 06.12 | 0.0935 12.25 |

| Ex. No. | Series No. | Chemical Formula | Ho | $SiO_2$ | AlN | $Si_3N_4$ |
|---|---|---|---|---|---|---|
| 48 | Ho1 (G + C) | $Ho_{6.33}Si_9Al_1O_{14}N_{10}$ | 1.044 38.76 | 0.4206 42.86 | 0.0409 06.12 | 0.0935 12.25 |

NB. All above composition were melted in graphite holder (small in size) and samples were inside of the Nb. Tube as well as during cooling $N_2$ were insert through lower\cold chamber instead of hot chamber.

| Ex No | Serie No. | Chemical formula | La | Dy | Gd | $SiO_2$ | AlN | $Si_3N_4$ |
|---|---|---|---|---|---|---|---|---|
| 49 | La2 (G) | $La_8Si_8Al_2O_{10}N_{14}$ | wt. (gm) 1.1113 mol. (%) 44.44 | — — | — — | 0.3004 27.78 | 0.0819 11.11 | 0.1403 16.67 |
| 50 | Dy2 (G, C) | $Dy_6Si_{10}O_{14}N_{10}$ | wt.(gm) — mol. (%) — | 1.1375 37.50 | — — | 0.4206 43.75 | — — | 0.1403 18.75 |

| Ex. No. | Series No. | Chemical formula | La | Sm | $SiO_2$ | AlN | $Si_3N_4$ |
|---|---|---|---|---|---|---|---|
| 51 | E10 (G) | $La_{7.67}Si_{10}O_9N_{15}$ | wt % 66.88 mol % 34.60 | — — | 16.97 40.59 | — — | 16.14 20.81 |
| 52 | A2 (G) | $La_{5.67}Si_7Al_3O_{12}N_{10}$ | wt(gm) 0.7876 mol % 42.30 | — — | 0.3605 23.08 | 0.1229 23.08 | 0.0468 11.54 |

| Ex. No. | Series No. | Chemical formula | La | Sm | $SiO_2$ | AlN | $Si_3N_4$ |
|---|---|---|---|---|---|---|---|
| 53 | E10 (G) | $La_{7.67}Si_{10}O_9N_{15}$ | wt % 66.88 mol % 34.60 | — — | 16.97 40.59 | — — | 16.14 20.81 |
| 54 | A2 (G) | $La_{5.67}Si_7Al_3O_{12}N_{10}$ | wt(gm) 0.7876 mol % 42.30 | — — | 0.3605 23.08 | 0.1229 23.08 | 0.0468 11.54 |

The invention claimed is:

1. A nitride glass with the general formula $\alpha_x\beta_y\gamma_z$, wherein
   $\alpha$ is at least one electropositive element chosen from the group consisting of Na, K, Rb, Be, Mg, Ca, Sr, Ba, Zr, Hf, Nb, Ta, W, Mo, Cr, Fe, Co, Ni, Zn, Sc, Y, La, Pb, Bi, Ce, Pr, Nd, Sm, Eu, Gd, Tb, Dy, Mn, Ho, Er, Tm, Yb, Lu, Th, Pa and U;
   $\beta$ comprises Si and optionally at least one element chosen from the group consisting of B, Ge, Ga and Al; and
   $\gamma$ is N together with O, wherein in an atomic ratio of O:N, where O+N equals 100, O is in the range of 20-65 and N is in the range of 35-80;
   wherein x, y and z are all independently >0.

2. A nitride glass according to claim 1, wherein $\alpha$ is chosen from the group consisting of Lu, Mg, Y, Sc, Nd, Gd, Eu, Er, Tb, Tm, Dy, Yb, Th, Pa, Ca, Sr, Ba, La, Pr, Ce, Sm, Mn and Ho.

3. A nitride glass according to claim 2, wherein $\alpha$ is chosen from the group consisting of Ca, Sr, Ba, La, Pr, Ce, Sm, Mn and Ho.

4. A nitride glass according to claim 1, wherein the ratio $\alpha:\beta$ is in the interval from 30:70 to 60:40.

5. A nitride glass according to claim 1, wherein the ratio $\beta:\gamma$ is in the interval from 33:67 to 22:78.

6. A nitride glass according to claim 1, wherein $\beta$ consists of Si.

7. A nitride glass according to claim 1, wherein the nitride glass has a hardness value above 5 GPa.

8. A nitride glass according to claim 1, wherein the nitride glass has a refractivity index above 1.4.

9. A nitride glass according to claim 1, wherein
the nitride glass possesses magnetic and/or magnetooptic properties; and
$\alpha$ comprises at least one element chosen from the group consisting of Ce, Pr, Nd, Sm, Eu, Gd, Tb, Dy, Ho, Er, Tm, Yb, Lu, Pa, U and Mn.

10. A method for preparing a nitride glass according to claim 1, comprising:
a) mixing chemicals corresponding to the desired composition to form a mixture, wherein the composition comprises $SiO_2$;
b) heating said mixture to a temperature of at least 1000° C. in the presence of nitrogen gas, thereby obtaining a melt;
c) maintaining the temperature of step b) until the melt is homogenous; and
d) cooling the homogeneous melt to a temperature below the transition temperature of the glass while using a cooling rate, that is sufficient to obtain a glass phase, wherein
$\alpha$ is a pure metal and/or a metal nitride, a metal hydride, or a compound that transforms to a metal nitride in step a) or b).

11. A method according to claim 10, wherein the temperature in steps b) and c) is above 1500° C.

12. A nitride glass with the general formula $\alpha_x\beta_y\gamma_z$, wherein
$\alpha$ is at least one electropositive element chosen from the group consisting of Na, K, Rb, Be, Mg, Ca, Sr, Ba, Zr, Hf, Nb, Ta, W, Mo, Cr, Fe, Co, Ni, Zn, Sc, Y, La, Pb, Bi, Ce, Pr, Nd, Sm, Eu, Gd, Tb, Dy, Mn, Ho, Er, Tm, Yb, Lu, Th, Pa and U;
$\beta$ comprises Si and optionally at least one element chosen from the group consisting of B, Ge, Ga and Al; and
$\gamma$ is N together with O, wherein, in an atomic ratio of O:N, where O+N equals 100, O is in the range of 20-65, and N is in the range of 35-80;
wherein x, y and z are all independently >0;
wherein the nitride glass is prepared by a method comprising the steps of:
a) mixing chemicals corresponding to the desired composition to form a mixture, whereby the composition comprises $SiO_2$;
b) heating said mixture to a temperature of at least 1000° C. in the presence of nitrogen gas, thereby obtaining a melt;
c) maintaining the temperature of step b) until the melt is homogenous; and
d) cooling the homogenous melt to a temperature below the transition temperature of the glass using a cooling rate that is sufficient to obtain a glass phase, wherein
$\alpha$ is a pure metal and/or a metal nitride, a metal hydride, or a compound that transforms to a metal nitride in step a) or b).

13. A nitride glass according to claim 1, wherein the ratio $\alpha:\beta$ is in the interval from 41:59 to 60:40.

14. A nitride glass according to claim 7, wherein said hardness value is above 9.9 GPa.

15. A nitride glass according to claim 7, wherein said hardness value is above 12.3 GPa.

16. A nitride glass according to claim 8, wherein said refractivity index is above 1.9.

17. A nitride glass according to claim 8, wherein said refractivity index is above 2.2.

18. A method according to claim 11, wherein the temperature in step b) is above 1800° C.

19. A nitride glass according to claim 12, wherein the temperature in step b) is above 1500° C.

20. A nitride glass according to claim 12, wherein the temperature in step b) is above 1800° C.

* * * * *